United States Patent Office 3,718,152
Patented Feb. 27, 1973

3,718,152
FLUID LOGIC ELEMENT
Hillebrand J. J. Kraakman, Emmasingel, Eindhoven,
Netherlands, assignor to U.S. Philips Corporation, New
York, N.Y.
Filed Jan. 5, 1971, Ser. No. 104,031
Claims priority, application Netherlands, Feb. 19, 1970,
7002383
Int. Cl. G05d 11/00; G06d 1/00
U.S. Cl. 137—114                                    4 Claims

ABSTRACT OF THE DISCLOSURE

A fluid responsive logic element comprising two inputs and an output. The communications between each of the inputs and the output includes a check valve co-operating with a stop. The check valves when viewed from the output have opposite senses of operation. When in the neutral positions of the two check valves the communication between the associated input and output is open.

The invention relates to a fluid-pressure-responsive logic element comprising at least three fluid gates and means responding to pressure differences and capable of cutting off the communication between anyone of two input gates and one output gate.

From French patent specification No. 1,421,167 a fluid-pressure-responsive logic element consisting essentially of two identical portions, which communicate with each other through a channel, each portion having three fluid gates, one of which communicates with said communication channel is known. The two further gates are used in one portion (first portion) as input gates and in the other portion (second portion) as an input gate and an output gate respectively. The two portions comprise a chamber divided by an apertured diaphragm into two compartments. Depending on whether the pressure is higher on one side or on the other, the diaphragm co-operates with one of two stops located on either side of the diaphragm. In the first portion the communication between one or the other input gate with the communication channel is cut off and in the second portion the communication between the communication channel and the output gate or between the input gate and the output gate respectively is cut off. In total the logic element described comprises four fluid gates, to wit three input gates and one output gate; each portion comprises two input gates and one output gate.

This logic element operates line an or-gate, in which the highest of the fluid pressures applied to the element appears at the output gate of the second portion. This means that by means of this logic element a memory storing effect cannot be obtained, since this would involve that a pressure obtained at an output in accordance with a given pressure (instruction signal) applied to an input gate should subsist unchanged after said instruction signal has disappeared, and should return to the initial state by a special restoring signal.

The invention has for its object to provide a logic element by means of which memory storing action can be obtained.

A logic element according to the invention is characterized in that said means comprise two automatically operating check-valves, one of which is included in the communication between an input gate and an output gate and the other is included in the communication between the other input gate and the output gate in order to obtain a storing effect while viewed from the output gate said check-valves operate in relatively opposite directions whereas in the neutral positions of the two check-valves the communications between the associated input gate and the output gate is open.

It should be noted that from Dutch patent application No. 6508204 a fluid storage device is known in which a storing effect is obtained by means of a diaphragm with a depression which changes position under the action of two pushing pressures operating in two opposite senses. The position of the depression produces a high or a low pressure in an outlet duct communicated with one of the pressure ducts. In order for device to operate as a store as described above, three pressure levels are required. It is a further disadvantage that the device has to be constantly fed by pressure in order to obtain an output signal indicative of the position of the diaphragm depression, which requires a contant supply of energy particularly when a great number of these elements are employed.

The invention will be described more fully with reference to the drawing.

Figure 1:
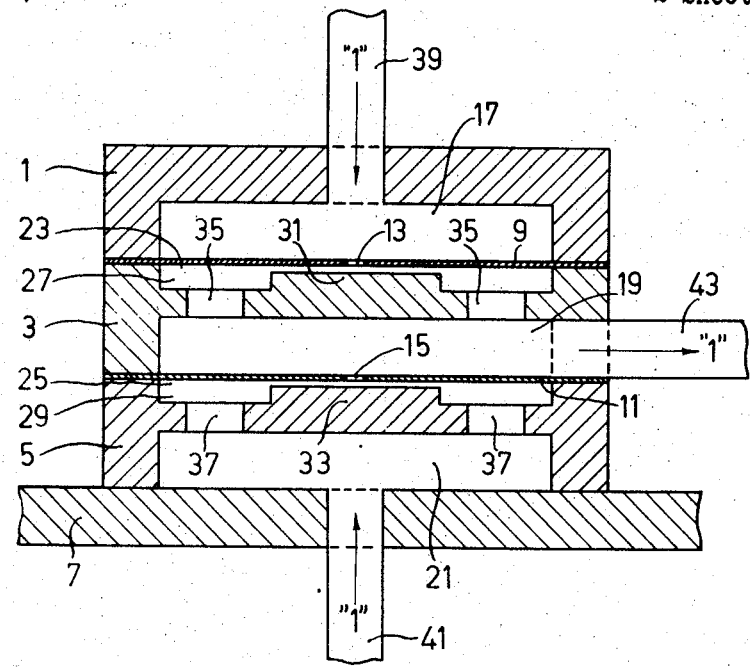
FIG. 1 is a sectional view of a fluid-pressure-responsive logic element embodying the invention in a position in which the fluid pressure is the same throughout the logic element.

The logic element shown in FIG. 1 comprises a housing formed by three plate-shaped parts (hereinafter termed briefly plates) 1, 3, 5 and 7, a diaphragm 9 being clamped between the plate-shaped portions 1 and 3 and a diaphragm 11 being clamped between the plate-shaped parts 3 and 5, the diaphragms 9 and 11 have central apertures 13 and 15. In the plate 1 a circular-cylindrical chamber 17 is recessed. The plates 3 and 5 are substantially identical and occupy the same positions relative to the diaphragms 9 and 11. In the plates 3 and 5, on one side (the lower side in the figure) circular-cylindrical chambers 19 and 21 and on the opposite side shallow, circular-cylindrical chambers 23 and 25 having annular depressions 27 and 29 are provided so that disc-shaped projections 31 and 33 serving as stops are left. Said automatically operating check valves are thus formed by the diaphragms 9 and 11 and the stops 31 and 33 respectively co-operating therewith. The chambers formed on either side of the plates 3 and 5 communicate with each other by means of bores 35 and 37. The apertures 13 and 15 in the diaphragms 9 and 11 are located opposite the centres of the projections 31 and 33 in the plates 3 and 5. The plate 7 shuts the chamber 21 in the plate 5 from the open air.

The chamber 17 in the plate 1 has a fluid input 39 and the chamber 21 in the plate 5 has a fluid input 41; the chamber 19 in the plate 3 has a fluid output 43.

Figure 2:
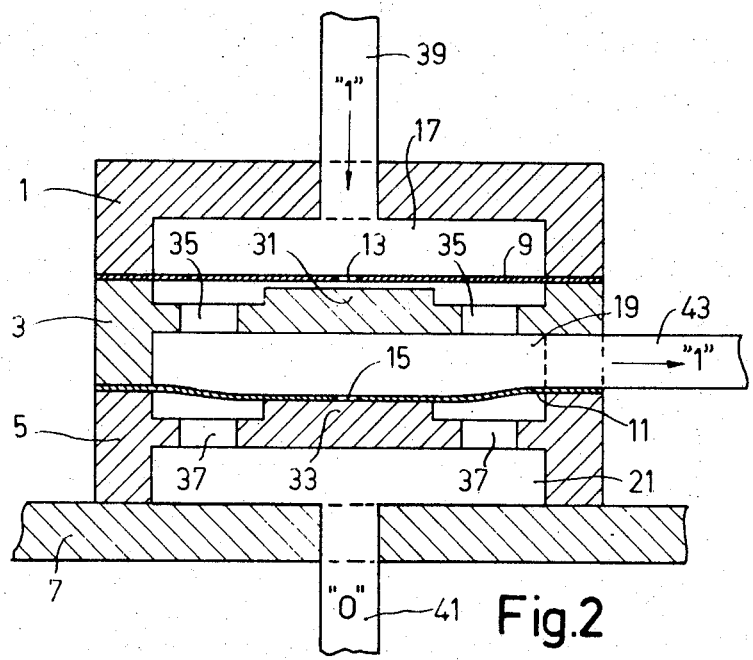
FIGS. 2 and 3 show the logic element of FIG. 1 in various consecutive operating phases.
Figure 3:
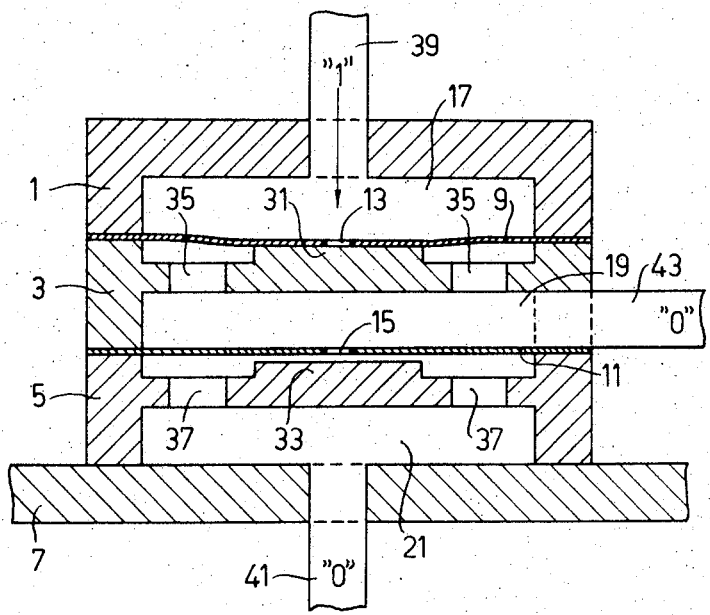
Figure 4:
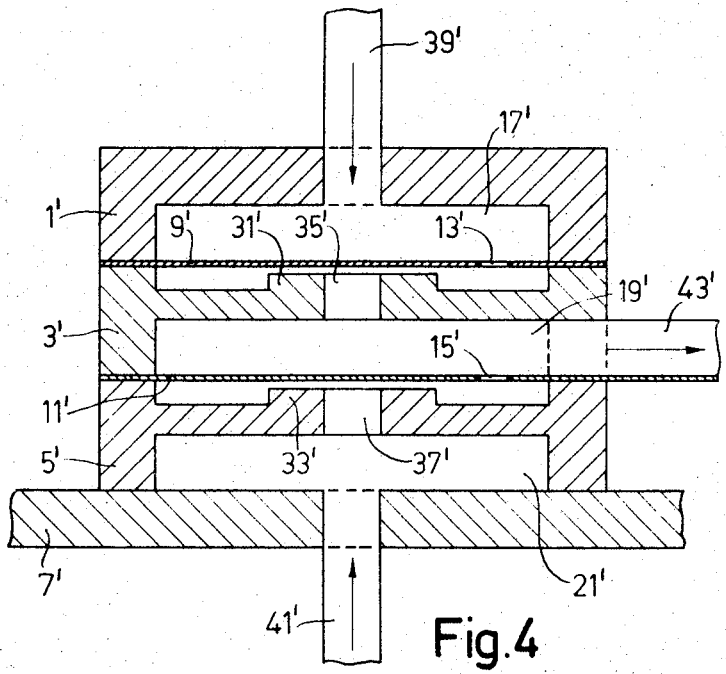
FIG. 4 is a sectional view of a fluid-pressure-responsive logic element embodying the invention.

The operation of the logic element described above will now be explained with reference to FIGS. 1, 2 and 3, which have the same reference numerals. In practice the fluid input 30 of the logic element shown in FIG. 1 communicates with a reservoir (not shown) having a pressure of a comparatively high level (hereinafter termed pressure level "1"). During substantially the whole operation cycle to be described it remains in open communication with said reservoir. When the input 41 is brought to the pressure level "1" by means of a so-called instruction signal of pressure level "1," pressure of the level "1" appears via the aperture 15 in the diaphragm 11 at the output 43. The diaphragms 9 and 11 are then in the position shown in FIG. 1. This position does not differ from the positions the diaphragms 9 and 11 would occupy, if a pressure of a comparatively low level (hereinafter termed pressure level "0") should prevail in the whole logic element and it is therefore termed the neutral position. While the open communication between the reservoir having the pressure level "1" and the chamber 17 in plate 1 is maintained, the signal pressure is reset from the level "1" to the level "0." Owing to the resultant pressure difference between the top and bottom sides of the diaphragm 11, which is maintained via the aperture 13 in the diaphragm 9 in its neutral position by the reservoir, the diaphragm 11 strikes the projection 33 operating as a stop and cuts off the open communication between the chamber 19 at pressure level "1" and the input 41 at pressure level "0." Thus in the absence of an instruction signal of level "1" at the input 41 the output 43 remains at the pressure level "1." Consequently this is the storing effect aimed at. By the pressure of level "1" at the output 43, for example, a fluid-controlled device is actuated and held in the state concerned by maintaining said pressure. The resultant state of the logic element is illustrated in FIG. 2. In order to capture usually unavoidable fluid leaking from the fluid-controlled device communicating with the output 43 it is necessary for the communication between the reservoir and the output 43 to remain open, even in the case when the pressure in the chamber 19 slightly drops down. For this purpose the distance between the stop 31 and the diaphragm 9 in the neutral position is chosen to be such that the diaphragm 9 does not engage the stop 31 due to the leakage occurring in practice and hence to the drop of pressure in the chamber 19 resulting therefrom, so that leaking fluid can be replenished. By providing an adequate capacity (buffer effect) of the chamber 19, the output 43 and the space of the fluid-controlled device to be held at the pressure level "1" it is avoided that at resetting the instruction signal to the level "0" the pressure in the chamber 19 should drop to an extent such that the diaphragm 9 strikes the stop 31, in which case replenishment of leaked fluid would not be possible. It should be noted that the size of the aperture 13 in the diaphragm 9 and the rigidity of said diaphragm also play a part in an engagement or non-engagement of the stop 31 by the diaphragm 9 in the case of leakage.

Resetting of the pressure of the level "1" prevailing at the output 43 to the level "0" may be carried out by bringing the input 39 at the pressure level "0" for a short time. This may be achieved by means of a three-way cock (not shown) between the reservoir and the input 39. Via the aperture 13 in the diaphragm 9 such a quantity of fluid leaks away from the chamber 19 and the output 43 that the output 43 regains the pressure level "0." The diaphragm 11 then returns to its neutral position. As soon as the output 43 is at the pressure level "0," the input 39 is reset to the pressure level "1" by means of the three-way cock. Since as a consequence a pressure difference is produced betwen the top side and the bottom side of diaphragm 9, the latter strikes the stop 31 so that the open communication between the reservoir at the pressure level "1" and the chamber 19 at the pressure level "0" is cut off. Thus the output 43 remains at the pressure level "0" (storing effect) until again a signal of the pressure level "1" appears at the input 41. Because in practice the diaphragm 9 never cuts off perfectly the communication between the reservoir and the chamber 19 at the pressure level "0" and the output 43, a slight leakage of fluid at the pressure level "1" will always occur via the aperture 13 in the diaphragm 9 to the chamber 19 at the pressure level "0" and to the output 43. In order to compensate for the pressure increase produced by this leakage in chamber 19 and output 43 the diaphragm 11 in its neutral position is spaced apart from the stop 33 by a distance such that in the event of leakage from the reservoir to the chamber 19 this diaphragm does not engage the stop 33 so that a drainage of fluid to the instruction input at the pressure level "0" is possible.

In a further embodiment of a logic element in accordance with the invention the apertures 13' and 15' in the diaphragms 9' and 11' have eccentric positions, whereas the bores 35' and 37' are at the centres of the disc-shaped projections 31' and 33'. The portions of the diaphragms 9' and 11' located around the apertures 13' and 15' no longer co-operate with the stops 31' and 33'. The operation of this embodiment is identical to that of the logic element shown in FIGS. 1, 2 and 3.

It should be noted that the fluid store described above operates, in principle, in the same manner when all pressure levels are inverted from high to low and from low to high levels, in which case in the embodiment shown the input 41 has to communicate with a reservoir of a comparatively low pressure level (level "0"), whereas the input 39 becomes the instruction input.

Finally, it should be noted that other devices may be employed as the check valves instead of diaphragms such as spring loaded balls or pistons which cooperate with the stops.

What is claimed is:

1. A fluid pressure responsive logic element comprising a housing, first, second and third chambers within said housing, a first input in fluid communication with said first chamber, a scond input in fluid communication with said second chamber, an output in fluid communication with said third chamber, first connection means for establishing fluid communication between said first and third chambers, a first automatically operating cut-off valve within said first connection means for cutting off fluid communication between said first and third chambers when the fluid pressure in said first input and said first chamber in communication therewith is at a relative high pressure level and the fluid pressure in said output and said third chamber in communication therewith is at a relative low pressure level, second connection means for establishing fluid communication between said second and third chambers, a second automatically operating cut-off valve within said second connection means for cutting off fluid communication between said second and third chambers when the fluid pressure in said output and said third chamber in communication therewith is at a relative high pressure level and the fluid pressure in said second input and said second chamber in communication therewith is at a relative low pressure level.

2. The fluid pressure responsive logic element according to claim 1 wherein said first and second cut-off valves comprise an apertured flexible diaphragm and an associated stop member when the fluid pressure difference on one side thereof, each said diaphragm engaging its associated stop member when the fluid pressure difference on opposite sides of the diaphragm is sufficient to close a gap between the diaphragm and its associated stop member, the fluid communication through each of said connection means being cut-off when the diaphragm thereof engages its associated stop member.

3. The fluid pressure responsive logic element according to claim 2 wherein when each said diaphragm engages its associated stop member the aperture in said diaphragm will be closed by its associated stop member.

4. A fluid-pressure responsive logic element comprising a first input means and an output means, a first communication channel between said first input means and said output means, a first automatically operating cut-off valve in said first communictaion channel, a second input means, a second communication channel between said second input means and said output means, a second automatically operating cut-off valve in said second communication channel, one of said first and second valves automatically closing the communication between the associated input means and output means when said one input means is at a relatively high pressure and the output means is at a relatively low pressure, the other of said valves automatically closing the communication between the other input means and the output means when the output means is at a relatively high pressure and said other input means is at a low pressure.

References Cited
UNITED STATES PATENTS

| | | | |
|---|---|---|---|
| 2,778,372 | 1/1957 | Jaquith | 137—111 |
| 3,485,258 | 12/1969 | Greene | 137—112 |
| 3,531,079 | 9/1970 | Greene | 251—61.1 |
| 2,991,805 | 7/1961 | Page | 235—201 ME |
| 3,245,426 | 4/1966 | Kreuter et al. | 137—112 |
| 3,550,847 | 12/1970 | Ecott | 235—201 ME |

ALAN COHAN, Primary Examiner

D. J. ZOBKIW, Assistant Examiner

U.S. Cl. X.R.

137—102, 517, 525; 235—201 ME; 251—61.1